UNITED STATES PATENT OFFICE.

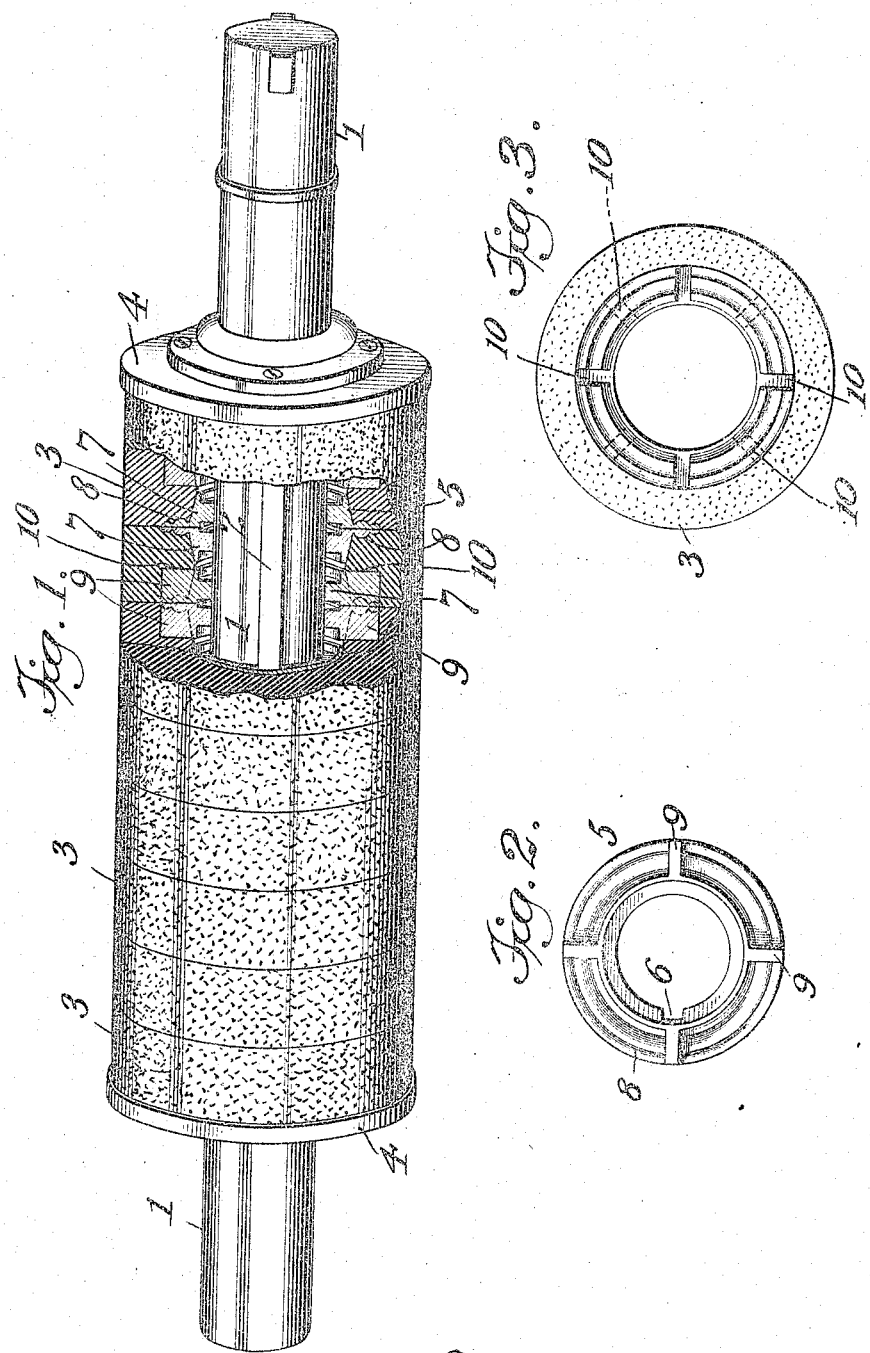

IRA F. BURNHAM, OF STOUGHTON, MASSACHUSETTS, ASSIGNOR TO THE STOUGHTON RUBBER COMPANY, A CORPORATION OF MASSACHUSETTS.

SQUEEZE-ROLL FOR WOOL-WASHING MACHINERY.

No. 900,055.    Specification of Letters Patent.    Patented Sept. 29, 1908.

Application filed February 2, 1907. Serial No. 355,526.

*To all whom it may concern:*

Be it known that I, IRA F. BURNHAM, a citizen of the United States, residing in Stoughton, Norfolk county, Massachusetts, have invented a new and useful Improvement in Squeeze-Rolls for Wool-Washing Machinery, of which the following is a specification.

This invention relates to squeeze-rolls for wool-washing machinery and other apparatus, and it has for its object the provision of a squeeze-roll made up of annular sections of vulcanized rubber compound or other suitable material which are secured upon a shaft or axis upon supporting collars of such construction that slipping of the roll sections is wholly obviated without the employment of great pressure in clamping the roll sections together.

In the accompanying drawings I have illustrated one embodiment of my invention, but it is to be understood that variations in the details of the construction illustrated may be resorted to within the scope of the appended claims without departing from the spirit of the invention.

In the drawings, in which corresponding parts are designated by similar characters of reference throughout: Figure 1 is a perspective view of a complete roll constructed in accordance with the present invention, a portion of the roll being broken away to show the internal arrangement of the devices for securing the roll sections upon the shaft. Fig. 2 is a face view of one of the supporting collars upon which the roll sections are mounted. Fig. 3 is a face view of one of the roll sections, the recesses on the hidden face of the section being indicated in dotted lines.

As illustrated, each roll comprises a shaft or axis 1 of suitable dimensions which is preferably provided throughout a portion of its length with a longitudinally disposed rib or spline 2. The roll sections 3, which vary in number according to the length of the roll desired, have annular bodies of a suitable rubber compound and are held upon the shaft between end plates 4, which are ordinarily of somewhat larger diameter than the roll sections. Each of the roll sections 3 is secured upon and between two supporting collars 5 each of which is internally notched at 6 to engage with the spline 2 on the shaft. Each of the collars 5 presents a beveled seating surface 7 upon which the innermost surface of the roll section carried by the collar is seated, and at the distal edge of the inclined seating surface 7 there is a flange 8 which is corrugated on the face adjacent to the inclined seating surface and flat on the other, as best shown in Fig. 1. On the corrugated face of the flange 8 at intervals of ninety degrees are provided four lugs 9, as best shown in Figs. 1 and 2, these lugs being adapted to engage with recesses formed therefor in the faces of the roll sections 3. The faces of the roll sections are, furthermore, corrugated near their inner peripheries to conform to the corrugations formed on the flanges 8, as clearly shown in Figs. 1 and 3. The recesses 10 which are formed in the faces of the roll sections to receive the lugs 9 are of considerable depth and, in order to prevent weakening the roll sections unduly by the formation of these recesses, the recesses on one face of each roll section are arranged between the recesses on the opposite face, as clearly shown in Fig. 3.

In assembling the elements of the roll structure the collars and roll sections are fitted upon the shaft successively in the relation shown in Fig. 1, then the assembled roll sections and collars are forced together by the application of sufficient pressure to insure close contact of the roll sections and a sufficient degree of compression of the material of the roll sections to prevent separation of the sections at the periphery of the roll when in service. Then the end plates 4 are secured firmly upon the shaft of the roll and the structure is complete.

As will be readily seen, the supporting collars upon which the roll sections are mounted and between which the roll sections are positively gripped are positively locked upon the shaft so that no rotation on the shaft is possible. The corrugated faces of the flanges 8 and the lugs 9 provided thereon obtain a firm hold upon the roll sections and effectively prevent any distortion of the roll sections and any circumferential movement thereof on the shaft when in service. Moreover, the parts of the roll are so designed that in case of injury to one or more roll sections the parts can be readily removed from the shaft and new sections introduced to replace those that have been damaged.

Having thus described my invention, what

I claim as new and desire to secure by Letters Patent is:

A squeeze-roll, comprising a shaft, a plurality of collars keyed thereon having inclined seating surfaces for the roll-sections and outwardly-extending flanges adapted to engage the faces of the roll-sections, and a plurality of roll-sections supported upon and between said collars and engaging said inclined seating surfaces, the flanges on said collars having circumferentially-corrugated faces for engagement with recessed corrugations on said roll-sections and having radially-arranged lugs on said corrugated faces engaging the recesses in said corrugations, whereby said roll-sections are gripped and locked against rotative movement upon said collars.

In testimony whereof, I have signed my name in the presence of two witnesses.

IRA F. BURNHAM.

Witnesses:
THOMAS J. SKINNER,
BONNELL L. SWIFT.